United States Patent
Wada

(10) Patent No.: US 6,914,981 B2
(45) Date of Patent: Jul. 5, 2005

(54) COMMUNICATION DEVICE

(75) Inventor: Hirotaka Wada, Tokyo (JP)

(73) Assignee: NEC Corporation, Tokyo (JP)

(*) Notice: Subject to any disclaimer, the term of this patent is extended or adjusted under 35 U.S.C. 154(b) by 803 days.

(21) Appl. No.: 09/819,818

(22) Filed: Mar. 29, 2001

(65) Prior Publication Data
US 2001/0026583 A1 Oct. 4, 2001

(30) Foreign Application Priority Data

Mar. 30, 2000 (JP) .......................... 2000-092744

(51) Int. Cl.⁷ .............................. H04M 1/00
(52) U.S. Cl. ..................... 379/399.01; 379/377
(58) Field of Search ................. 379/377, 399.01, 379/219, 220.01, 93.01, 93.09, 394, 398, 402, 403, 404, 93.05

(56) References Cited

U.S. PATENT DOCUMENTS 6,404,774 B1 * 6/2002 Jenness .......... 379/399.01
6,477,249 B1 * 11/2002 Williamson et al. ... 379/399.01

FOREIGN PATENT DOCUMENTS

| JP | 11-285035 | 10/1999 |
| JP | 11-308352 | 11/1999 |

* cited by examiner

Primary Examiner—Jefferey F. Harold
(74) Attorney, Agent, or Firm—Foley & Lardner LLP

(57) ABSTRACT

A communication device has a cut-off frequency switching unit for switching a cut-off frequency for communication data at a communication line, and a confirming unit for confirming whether or not a communication partner has the cut-off frequency switching unit, in advance of sending and receiving of communication data. The confirming unit is structured such that switching control of the cut-off frequency switching unit is carried out in accordance with results of confirmation.

6 Claims, 4 Drawing Sheets

COMMUNICATION DEVICE

FIELD OF THE INVENTION

The present invention relates to a communication device, and in particular, to a modem which is suited for use in a communication device which carries out xDSL (x Digital subscriber Line) type communication. Here, x collectively represents A, H, S, V and the like.

BACKGROUND OF THE INVENTION

Currently, much attention is focussed on communication systems such as A (Asymmetric) DSL, S (Symmetric) DSL, V (Very high speed) DSL, H (High speed) DSL, and the like, as methods for carrying out data communication by using telephone lines. Accompanying this trend, research and development are being carried out on carrying out data communication simultaneously at the same line, while using even conventional telephones. When data is multiplexed with a telephone, in order for conventional telephone service to not be adversely affected, it is necessary to carry out design for the xDSL modem while paying very close attention. It is desirable to reliably carry out telephone service even if some functions must be sacrificed.

On the other hand, in a case in which telephone service is not needed, it is desirable to carry out communication faster. In this case, when using an xDSL modem which is the same as in the case when multiplexed with telephone service, useless frequency space arises, which is not efficient. The reasons for this are described hereinafter.

Namely, when telephone service and data communication service are multiplexed on the same line, the line capacity of the modem is specified by recommendation, For example, in ITU-T Recommended G.992.1 Annex E, the line capacity is specified to be 35 nF, and the cut-off frequency is 45 KHz. In contrast, with data communication which is not multiplexed with telephone service, there is no such stipulation. However, when a cut-off frequency of 45 KHz is applied as is to data communication which is not multiplexed with telephone service, the band in a region lower than 45 KRz cannot be utilized, which is inefficient.

FIG. 4 is a structural diagram of a case in which telephone service and data communication service are multiplexed on the same telephone line. FIG. 5 is a structural view of a case in which communication service is not multiplexed with telephone service. In FIG. 4, a data terminal 16 is connected to a telephone line 13 via an xDSL modem 15 and a branching filter 14. Further, a telephone 19 is also connected to the telephone line 13 via the branching filter 14.

The telephone line 13 is connected to a data network 10 via a branching filter 12 and an xDSL modem 11 in a station of a communication provider. Further, the telephone line 13 is connected to a public network 17 via the branching filter 12 and an exchanger 18. In the case illustrated in FIG. 4 in which data communication service and telephone service are multiplexed, the line capacities of the modems 11, 15 are 35 nF, in accordance with the previously-mentioned ITU-T recommendation. Therefore, the cut-off frequency for communication data is 45 KHz.

On the other hand, in the case shown in FIG. 5 in which data communication service is not multiplexed with telephone service, a data terminal 24 is connected to a telephone line 22 via an xDSL modem 23, and the telephone line 22 is connected to a data network 20 via an xDSL modem 21 at a station of the communication provider. Also in FIG. 5, in a case in which the aforementioned specified 35 nF is used as the line capacities of the modems 21, 23, the cut-off frequency must be 45 KHz. Therefore, regardless of the tact that data communication service is not multiplexed with telephone service, the use of the band in a region lower than 45 kHz is limited, which is inefficient.

Therefore, conventionally, a technique has been used in which two different types of modems are used, i.e., the modem of the type used for the system of FIG. 4 and the modem used for the system of FIG. 5, and the appropriate modem is used in accordance with the system, which is also inefficient.

SUMMARY OF THE INVENTION

The present invention relates to a communication device which is efficient and in which automatic setting of a cut-off frequency at a communication line is possible.

In accordance with the present invention, there is provided a communication device comprising: cut-off frequency switching means for switching a cut-off frequency for communication data at a communication line. The cut-off frequency switching means is structured to carry out switching of a D.C. cut-off capacitor.

Further, the communication device further comprises: confirming means for confirming whether or not a communication partner has the cut-off frequency switching means, in advance of sending and receiving of communication data. The confirming means is structured such that switching control of the cut-off frequency switching means is carried out in accordance with results of confirmation. The communication line is a telephone line, and the communication device is a modem. xDSL (x Digital Subscriber Line) type communication, which carries out data communication via the telephone line, is carried out.

Operation of the present invention will be described. The present invention is structured such that a cut-off frequency for communication data at a communication line is automatically switched. Thus, information transmission in a frequency space of a broader range is possible.

DESCRIPTION OF THE PREFERRED EMBODIMENTS

Figure 1:
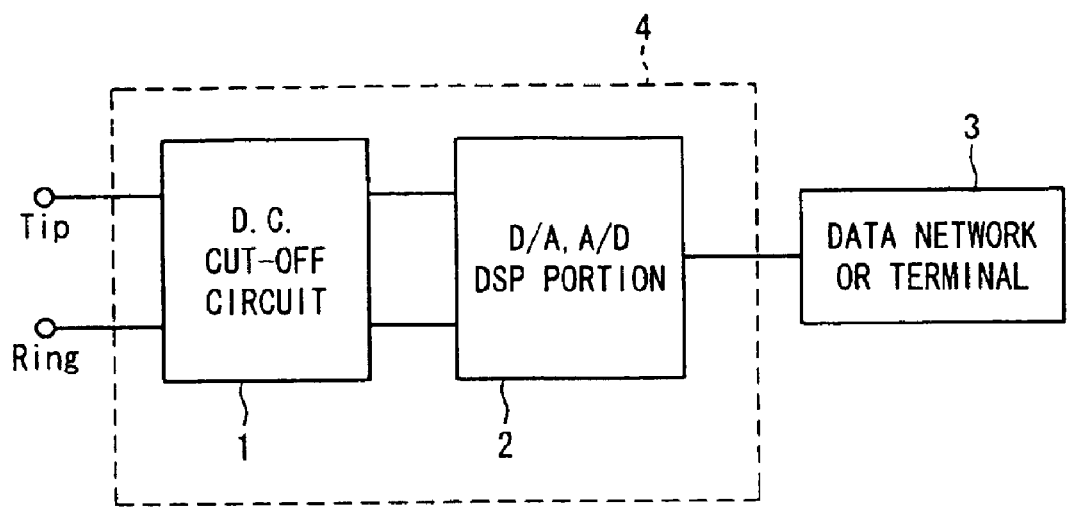
FIG. 1 is a schematic structural diagram of an embodiment of the present invention.

Hereinafter, an embodiment of the present invention will be described with reference to the drawings. FIG. 1 is a schematic block diagram of an xDSL modem in accordance with an embodiment of the present invention. In FIG. 1, a modem 4 in accordance with the present invention has a D.C. cut-off circuit 1, and a DSP (digital signal processor) 2 having a D/A (digital/analog) conversion function and an A/D (analog/digital) conversion function. The DSP 2 is connected to a data network or terminal, and communication can be carried out thereat by a transmission method which is suited for a terminal or a network.

Figure 2:
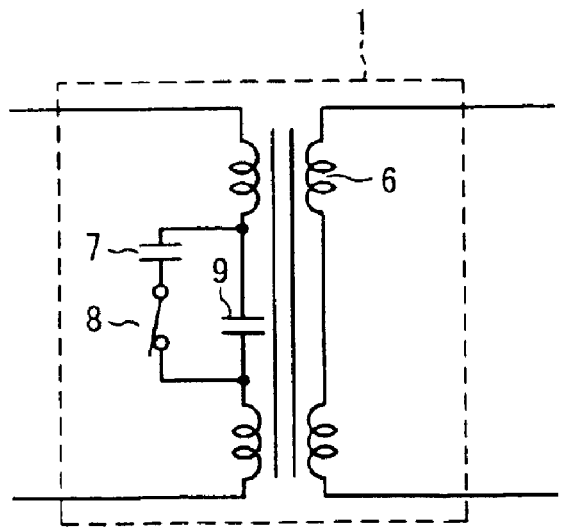
FIG. 2 is a circuit diagram which illustrates an example of a D.C. cut-off circuit of FIG. 1.

The D.C. cut-off Circuit 1 is a four terminal network circuit structure. A concrete example thereof is illustrated in FIG. 2. Among the four terminals, two terminals are connected to terminals of a Tip and a Ring, and the other two terminals are connected to the DSP 2. Referring to FIG. 2, the D.C. cut-off circuit 1 is structured by a transformer 6, capacitors 7, 9, and a switch 8. The primary side of the transformer 6 is connected to terminals of the Tip and the Ring. A parallel circuit of the capacitor 9 and a D.C. connection circuit of the capacitor 7 and the switch 8 is provided at the primary side of the transformer 6. The parallel circuit is inserted in series with a primary winding.

The DSP portion 2 shown in FIG. 1 has the original communication function for carrying out communication between a network and a terminal, as well as has a function for carrying out giving and receiving of communication parameters with a modem, which is a communication partner thereof, in accordance with a protocol which is determined in advance.

Figure 3:
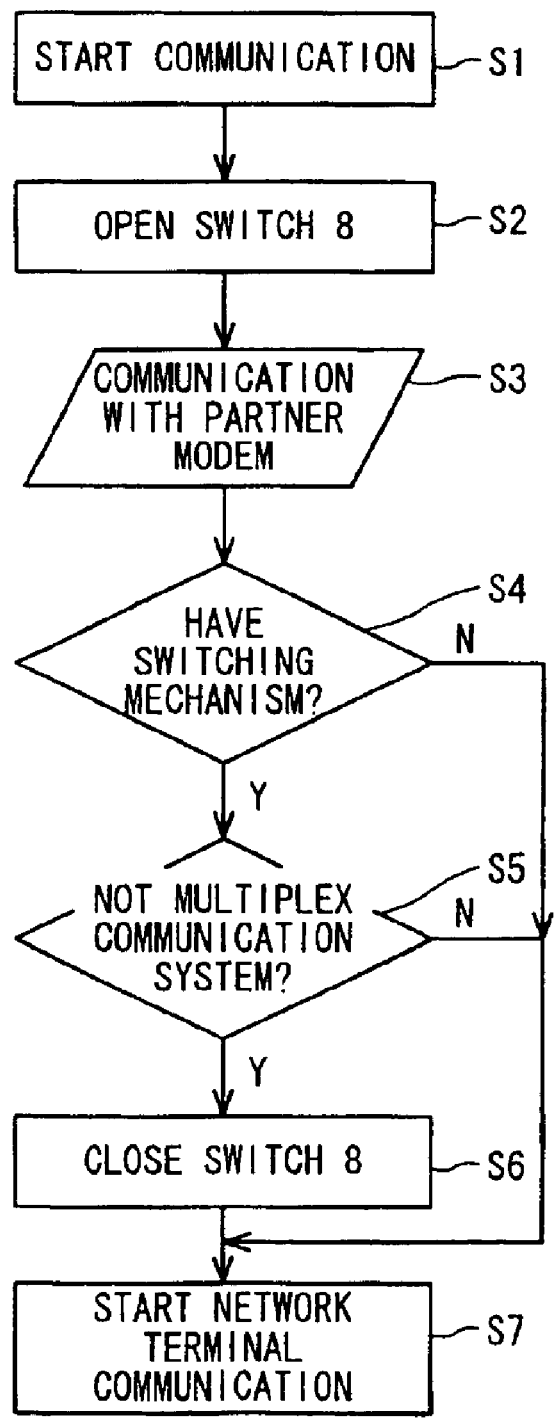
FIG. 3 is a flowchart which shows operation of the embodiment of the present invention.
Figure 4:
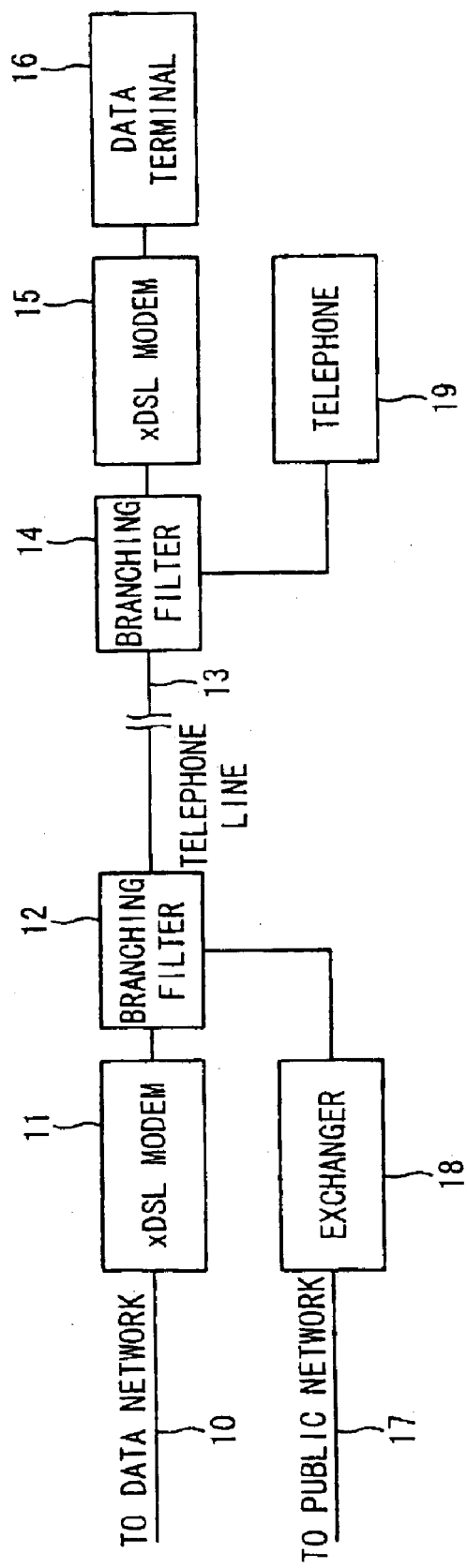
FIG. 4 is a diagram which shows a system structure in a case in which telephone service using a telephone line and data communication service are multiplexed.
Figure 5:
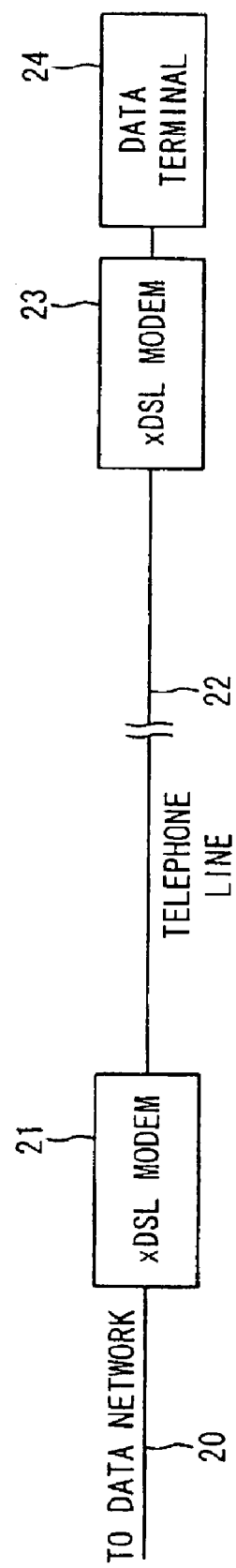
FIG. 5 is a diagram which shows a system structure in a case of only data communication service using a telephone line.

FIG. 3 is a flowchart for explaining operation of the embodiment of the present invention. In response to a request to start communication (step S1), control is carried out to open the switch 8 of FIG. 2 (step S2). A state is set in which there is only connection with the capacitor 9 which is 35 nF, which is the line capacity prescribed for a case of multiplexing with telephone service. In this state, communication is carried out to effect giving and receiving of communication parameters with the modem which is the communication partner (step S3). In the structure of FIG. 4, exchange of communication parameters is carried out between a modem 15 and a modem 11. In the structure of FIG. 5, exchange of communication parameters is carried out between a modem 21 and a modem 23.

One of the parameters in this case may be whether there is the switch a or not. Namely, information is included which expresses whether or not there is a mechanism for switching the line capacity. Or, information is included which expresses whether or not a communication system is multiplexed with telephone service. If the partner modem does not have a switching mechanism (step S4), communication is carried out (step S7) with the switch 8 maintained in the open state. (This corresponds to the case of FIG. 4.)

In contrast, in a case in which the partner modem has a switching mechanism (step S4) and the communication system is not a multiplexing system (step S5), the switch 8 is closed (short) (step S6), and the line capacity between the Tip and the Ring is made to be a parallel connection of the capacitors 7 and 9, for example, is switched to a total capacity of 1 μF. In this way, the cut-off frequency of the data communication is changed from 45 KHz to 1.6 KHz, and communication in a lower region is possible (step S7). (This corresponds to the case of FIG. 5.) Further, even if the partner modem has a switching mechanism, in the case of a multiplex communication system (step SS), the Switch a is not switched, and is kept open. (This corresponds to the case of FIG. 4.)

Further, the information as to whether there is a multiplex communication system or not is set in the communication parameter which is transmitted by the modem 11 or 21 at the station. Therefore, it is possible for the modem 15 or 23 at the terminal side to know this information.

In this way, in the case in which there is not a multiplex communication system, the cut-off frequency of communication data at the communication line of the D.C. cut-off circuit 1 is changed from 45 Krz to 1.6 KHz. Data communication in a wider band is thereby possible between terminals and networks.

Further, the circuit diagram which is illustrated in FIG. 2 is merely an example, and it should be clear that various modifications are possible. Moreover, the circuit may have a digital filter structure.

As described above, in accordance with the present invention, before data communication is carried out, the presence/absence of a switching mechanism of the partner and the form of the current communication system are confirmed, and control is carried out to automatically switch the cut-off frequency. As a result, there is the effect that, even if the user does not know the structure of the modem or the like of the partner, optimal and efficient communication is possible. Moreover, there is no need to ready a different type of modem depending on whether or not telephone service and data communication service are multiplexed. Thus, there is the effect that this also is efficient.

What is claimed is:

1. A communication device comprising:

cut-off frequency switching means for switching a cut-off frequency for communication data at a communication line; and confirming means for confirming whether or not a communication partner has said cut-off frequency switching means, in advance of sending and receiving of communication data, wherein said cut-off frequency switching means is structured to carry out switching of a D.C. cut-off capacitor, wherein said confirming means is performed while said cut-off frequency means has switched the D.C. cut-off capacitor to be disengaged from the communication line, and wherein said cut-off frequency means maintails the D.C. cut-off capacitor to be disengaged when it is determined that the communication line is part of a multiplex communication system that includes a telephone network line and a data network line, irrespective as to whether or not the communication partner has said cut-off frequency switching means.

2. The communication device according to claim 1, wherein said confirming means is structured such that switching control of said cut-off frequency switching means is carried out in accordance with results of confirmation.

3. The communication device according to claim 1, wherein the communication line is a telephone line, and said communication device is a modem.

4. The communication device according to claim 3, wherein xDSL (x Digital Subscriber Line) type communication, which carries out data communication via the telephone line, is carried out.

5. A method of communicating between a first modem and a second modem connected to each other via a communication line, the method comprising:

at the first modem, opening a switch to allow communication over the communication line only at or above a first frequency:

opening communication with the second modem utilizing signals at or above the first frequency sent over the communication line;

at the second modem, providing information over the communication line to the first modem indicative as to whether or not the second modem is coupled to a network that includes a multiplexed communication system, the information being provided using signals sent over the communication line at or above the first frequency;

at the first modem, receiving the information over the communication line that has been provided by the second modem, and a) closing the switch at the first modem to enable communications between the first and second modems over the communication line using signals at or above a second frequency lower than the first frequency, when the information indicates that the second modem is not coupled to a network that includes a multiplexed communication system, and b) keeping the switch opened at the first modem to only allow communications between the first and second modems over the communication line using signals at or above the first frequency, when the information indicates that the second modem is coupled to a network that includes a multiplexed communication system.

6. The method according to claim 5, wherein the first frequency corresponds to 45 kHz, and the second frequency corresponds to 1.6 kHz.

* * * * *